(12) United States Patent
Min

(10) Patent No.: US 6,912,721 B2
(45) Date of Patent: Jun. 28, 2005

(54) OPTICAL READ AND WRITE APPARATUS

(75) Inventor: Bong-Girl Min, Suwon-si (KR)

(73) Assignee: Samsung Electro-Mechanics Co., Ltd., Kyunggi-Do (KR)

(*) Notice: Subject to any disclaimer, the term of this patent is extended or adjusted under 35 U.S.C. 154(b) by 223 days.

(21) Appl. No.: 10/447,349

(22) Filed: May 28, 2003

(65) Prior Publication Data

US 2004/0037207 A1 Feb. 26, 2004

(30) Foreign Application Priority Data

Aug. 22, 2002 (KR) ................................ 10-2002-0049834

(51) Int. Cl.[7] ............................................. G11B 7/08
(52) U.S. Cl. ..................................................... 720/674
(58) Field of Search ................................ 720/674, 675

(56) References Cited

U.S. PATENT DOCUMENTS

| | | | | |
|---|---|---|---|---|
| 5,008,873 A | * | 4/1991 | Tanaka et al. | 369/44.14 |
| 5,124,974 A | * | 6/1992 | Kato et al. | 369/256 |
| 5,182,739 A | * | 1/1993 | Kime et al. | 369/44.15 |
| 5,815,483 A | * | 9/1998 | Iizuka | 720/674 |
| 6,493,309 B2 | * | 12/2002 | Sogawa et al. | 720/674 |

FOREIGN PATENT DOCUMENTS

KR  10-183893  12/1998

* cited by examiner

Primary Examiner—David D Davis
(74) Attorney, Agent, or Firm—Gottlieb, Rackman & Reisman, P.C.

(57) ABSTRACT

Disclosed herein is an optical read and write apparatus. The optical read and write apparatus includes a deck base, a pickup base, a transfer guide and one or more tension springs. In the deck base, an opening is formed in the center portion thereof, a main shaft and a secondary shaft are disposed at both sides of the opening, and a turntable is mounted on one side thereof. In the pickup base, an object lens is provided in the center portion thereof, a guide member having a guide groove fitted around the secondary shaft is formed in the rear portion thereof, and an adjusting screw is extended from the front thereof. In the transfer guide, a connection hole is formed to receive the adjusting screw and to allow the transfer guide to be joined to the pickup base by an adjusting nut and a guide hole is formed to be fitted around the main shaft. The tension springs are positioned between the pickup base and the transfer guide to elastically press the pickup base.

8 Claims, 7 Drawing Sheets

OPTICAL READ AND WRITE APPARATUS

BACKGROUND OF THE INVENTION

1. Field of the Invention

The present invention relates generally to an optical read and write apparatus, and more particularly to an optical read and write apparatus that is capable of correcting the difference between the phases of an object lens and a turntable by freely adjusting the position of an optical pickup in the direction perpendicular to the direction of transfer.

2. Description of the Prior Art

In general, an optical read and write apparatus is an apparatus that reads and/or writes information from/onto a disk using an optical system.

In such an optical read and write apparatus, when an optical disk is placed on a turntable and rotated at a certain speed by a spindle motor, an optical pickup reads optical signals from or writes information onto the optical disk by irradiating a laser beam onto the optical disk while reciprocating in the radial direction of the optical disk.

With reference to FIG. 1, the deck base assembly of a conventional optical read and write apparatus is described below. An opening 1a is formed in the center portion of a deck base 1, a spindle motor 2 is mounted on one side of the deck base 1 in the vicinity of the opening 1a, and a turntable 3 on which an optical disk "D" is placed is coupled to and rotatably supported by the shaft of the spindle motor 2.

A main shaft 6 and an secondary shaft 6' are arranged to be parallel to each other across the opening 1a, and the ends of the shafts 6 and 6' are supported by support members 7 fastened to the deck base 1 to be tilted.

An optical pickup 5 equipped with an object lens 5a is engaged with the main shaft 6 and the secondary shaft 6', and supported to be moved along the main shaft 6 and the secondary shaft 6' by a gear train 8.

However, the convention optical read and write apparatus constructed as described above requires technologies for minimizing a phase error so as to improve optical performance.

In this case, the phase error means a difference between the distance from the main shaft 6 to the center of the object lens 5a (or a point on which a light beam is focused) and the distance from the main shaft 6 to the center of the turntable 3 generated by various causes, even though the distances must be kept equal.

Accordingly, the conventional optical read and write apparatus is problematic in that the phase error occurs due to various causes, such as the deformation of component parts and the allowance of assembly.

In more detail, the phase difference occurs when the component parts are assembled into an optical pickup.

That is, when the focus of a light beam is adjusted by rotating a laser diode or changing the position of an object lens, component parts are bonded and bonding material is solidified, the position of the laser diode or object lens is undesirably changed frequently, so the focus of the light beam is undesirably changed, thus causing-the phase error.

Another cause of the phase error is an assembly error that occurs when a spindle motor is attached to a deck base or an optical pickup is attached to a main shaft and a secondary shaft.

Another cause of the phase difference occurs when a tilt (or skew) is adjusted.

When an optical disk and an object lens are parallel with each other, a light beam is correctly focused at a position on an optical disk, so optical performance is efficiently implemented. In practice, the optical disk or the object lens is tilted for various reasons and, therefore, the optical disk and the object lens are not parallel with each other. The adjustment of a tile is performed to cause the optical disk and the object lens to be parallel with each other by adjusting the tilt of an optical pickup.

One of methods of adjusting the tilt of an optical pickup is to adjust the tilt of the optical pickup by adjusting the heights or tilts of a main shaft and a secondary shaft. Meanwhile, when the tilt of the optical pickup is adjusted as described above, the position of the optical pickup is changed in proportion to the adjusted tilt of the optical pickup, so the phase error occurs.

As described above, the conventional optical write and read apparatus undergoes the phase error for various reasons, so errors occur when the optical pickup operates, thus deteriorating the reliability of a product.

SUMMARY OF THE INVENTION

Accordingly, the present invention has been made keeping in mind the above problems occurring in the prior art, and an object of the present invention is to provide an optical read and write apparatus that allows the position of an optical pickup to be easily adjusted in the direction perpendicular to the direction of transfer of the optical pickup, so the non-coincidence in the phases of an object lens and a turntable can be overcome.

In order to accomplish the above object, the present invention provides an optical read and write apparatus, comprising a deck base in which an opening is formed in the center portion thereof, a main shaft and a secondary shaft are disposed at both sides of the opening, and a turntable on which an optical disk is placed is mounted on one side thereof; a pickup base in which an object lens is provided in the center portion thereof, a guide member having a guide groove fitted around the secondary shaft is formed in the rear portion thereof, and an adjusting screw is extended from the front thereof; a transfer guide in which a connection hole is formed to receive the adjusting screw of the pickup base and to allow the transfer guide to be joined to the pickup base by an adjusting nut, and a guide hole is formed to be fitted around the main shaft; and one or more tension springs positioned between the pickup base and the transfer guide to elastically press the pickup base.

In addition, the present invention provides an optical read and write apparatus, in which an opening is formed in a portion thereof, a turntable on which an optical disk is placed is mounted on one side thereof, and an optical pickup is coupled to a main shaft and a secondary shaft disposed at both sides of the opening and reads, and writes information from/onto an optical disk while reciprocating along the opening, wherein the optical pickup is comprised of a pickup base, in which an object lens is provided in the center portion of the pickup base and a guide member having a guide groove fitted around the secondary shaft is formed in the rear portion of the pickup base, and a transfer guide coupled to be moved along the main shaft; the pickup base and the transfer guide are joined together by inserting an adjusting screw extended from the front of the pickup base into a connection hole formed through the transfer guide and tightening an adjusting nut around the inserted adjusting screw, so as to allow an interval therebetween to be adjusted; and one or more tension springs are disposed between the pickup base and the transfer guide to elastically press the pickup base.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
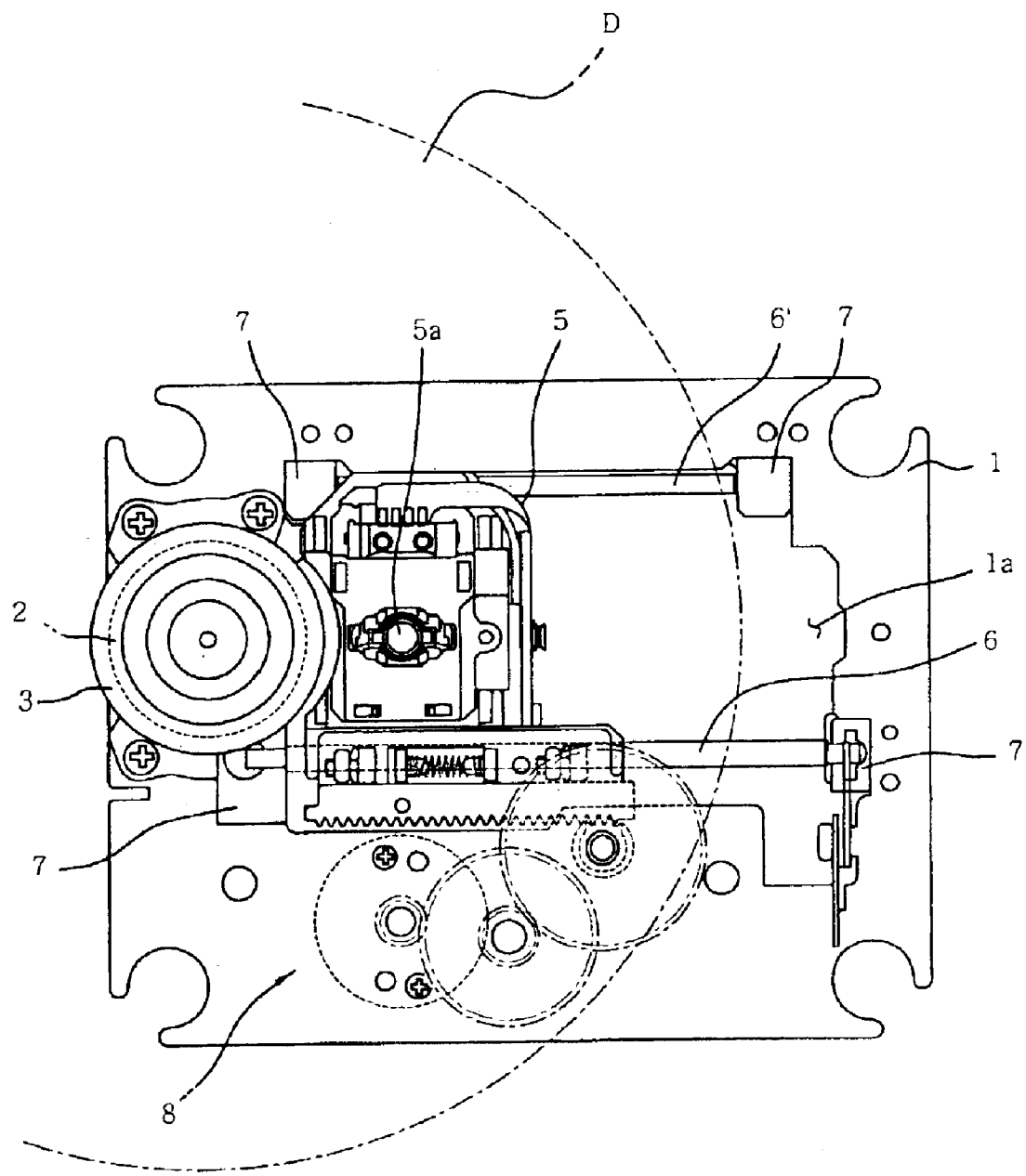
FIG. 1 is a plan view of a deck base assembly of a conventional optical read and write apparatus.

Reference now should be made to the drawings, in which the same reference numerals are used throughout the different drawings to designate the same or similar components.

Figure 2:
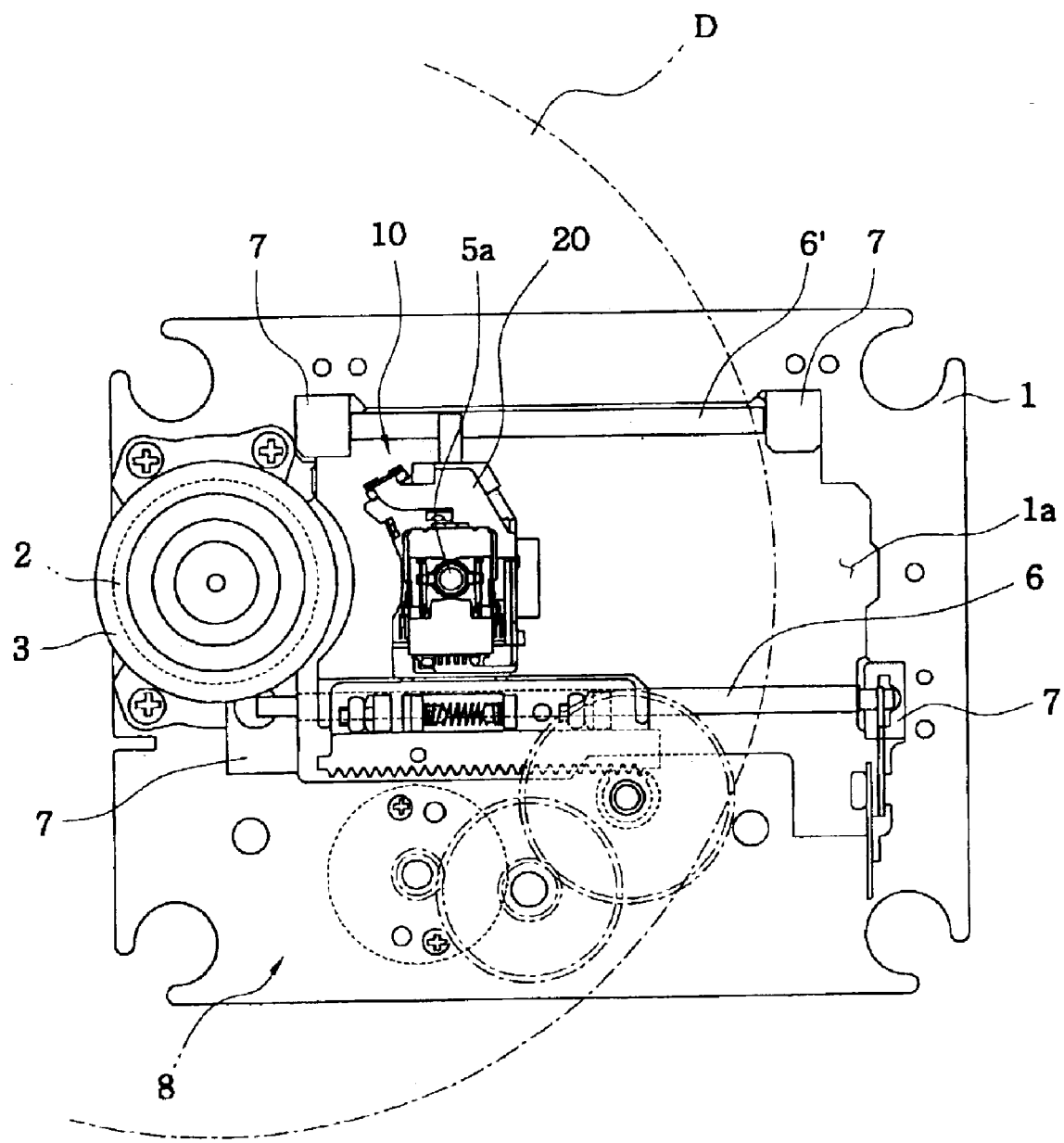
FIG. 2 is a plan view of a deck base assembly of an optical read and write apparatus in accordance with the present invention.
Figure 3:
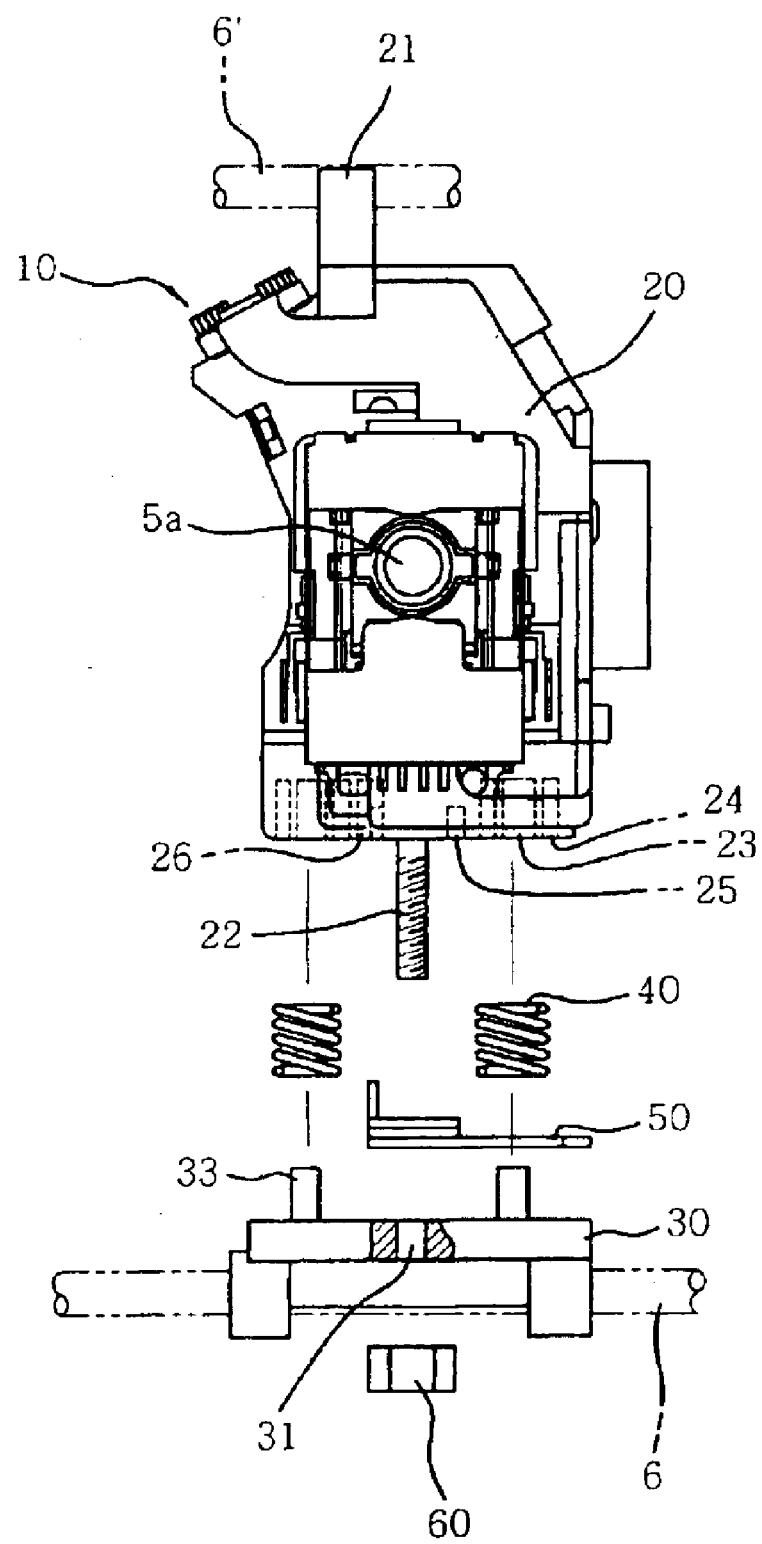
FIG. 3 is a partially exploded plan view of the optical pickup of the optical read and write apparatus of the present invention.
Figure 4:
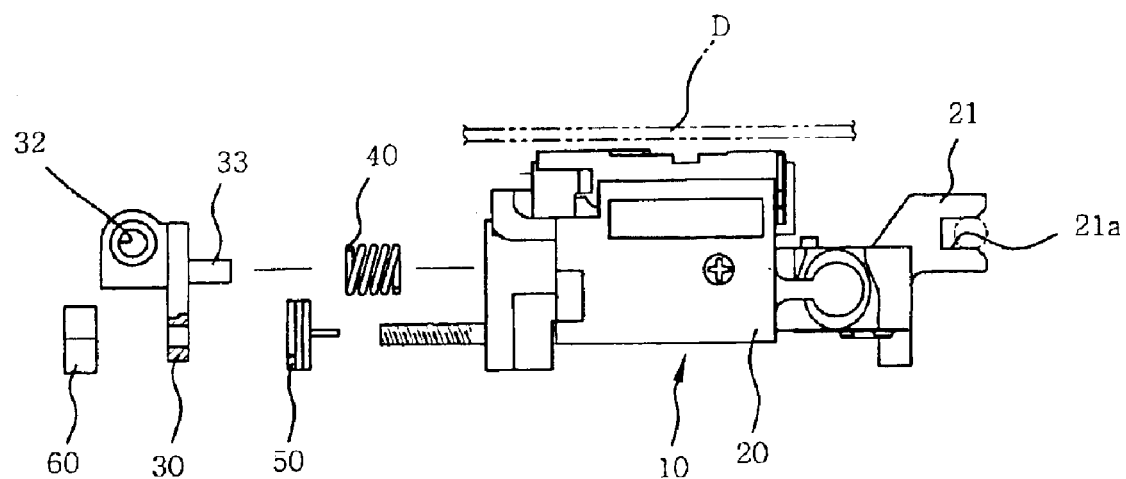
FIG. 4 is a partially exploded side view of the optical pickup of the optical read and write apparatus of the present invention.
Figure 5:
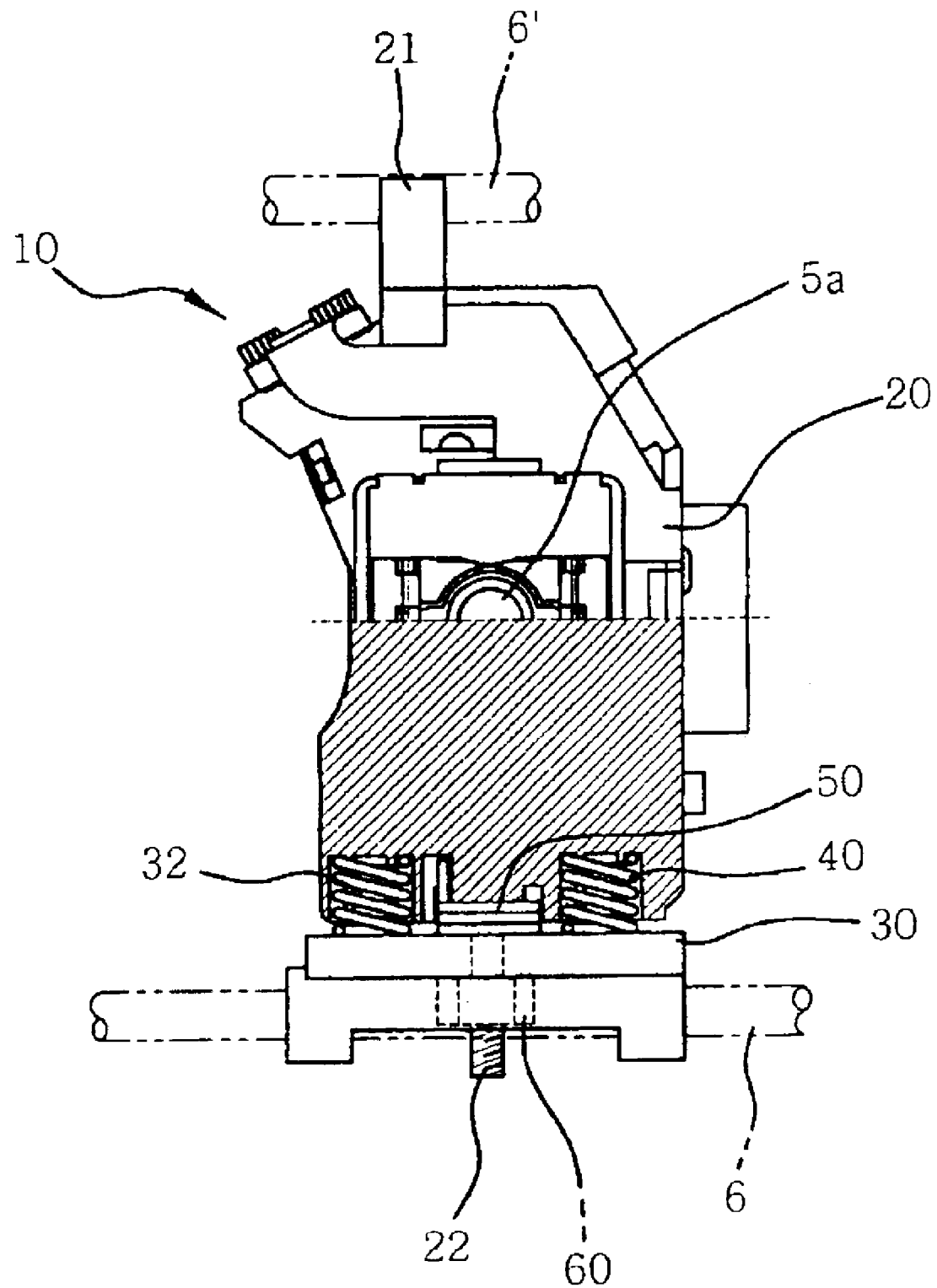
FIG. 5 is a partially sectional plan view showing the assembly of the optical pickup of FIG. 3.
Figure 6:
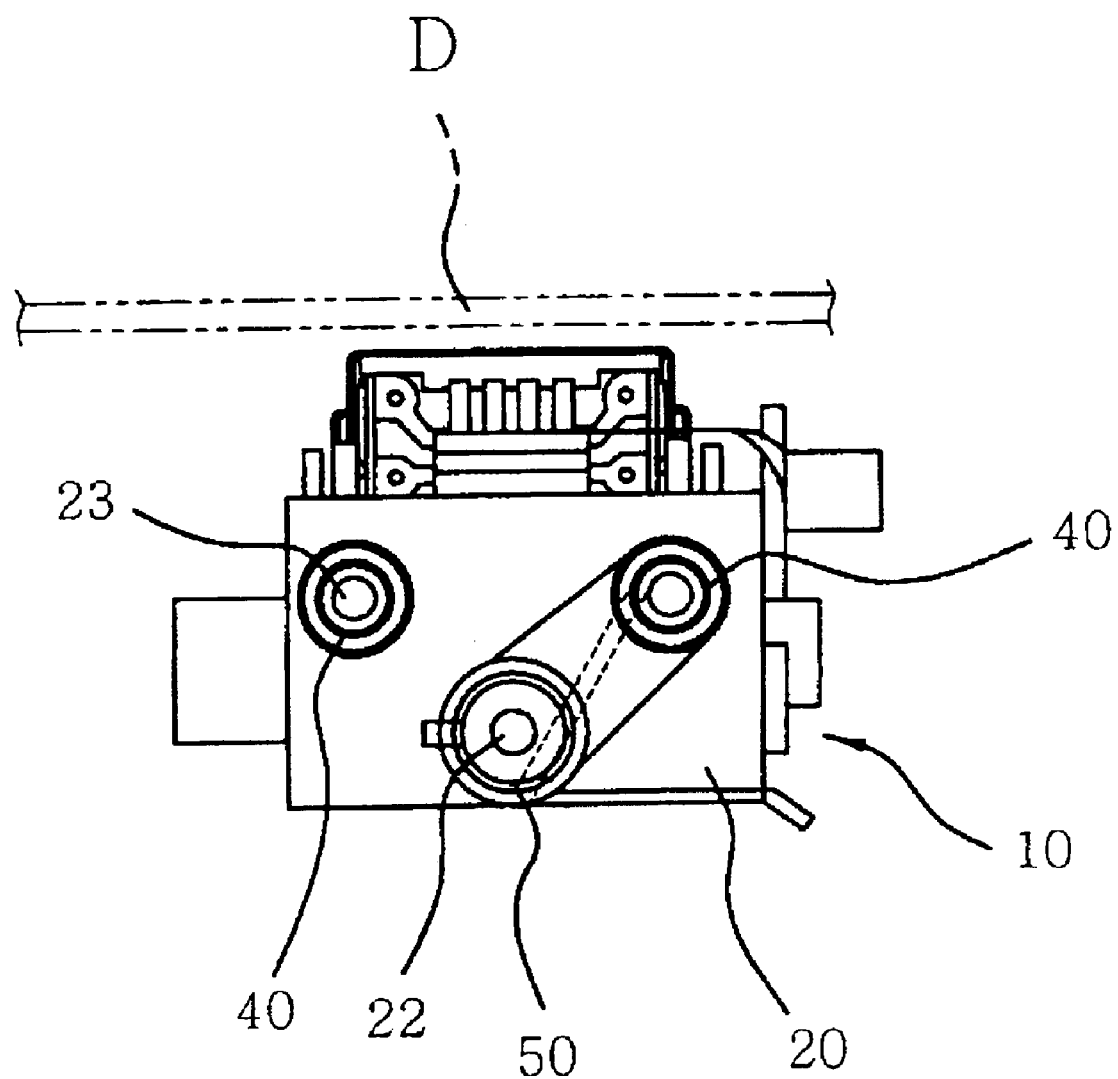
FIG. 6 is a front view showing the installation of various springs.
Figure 7:
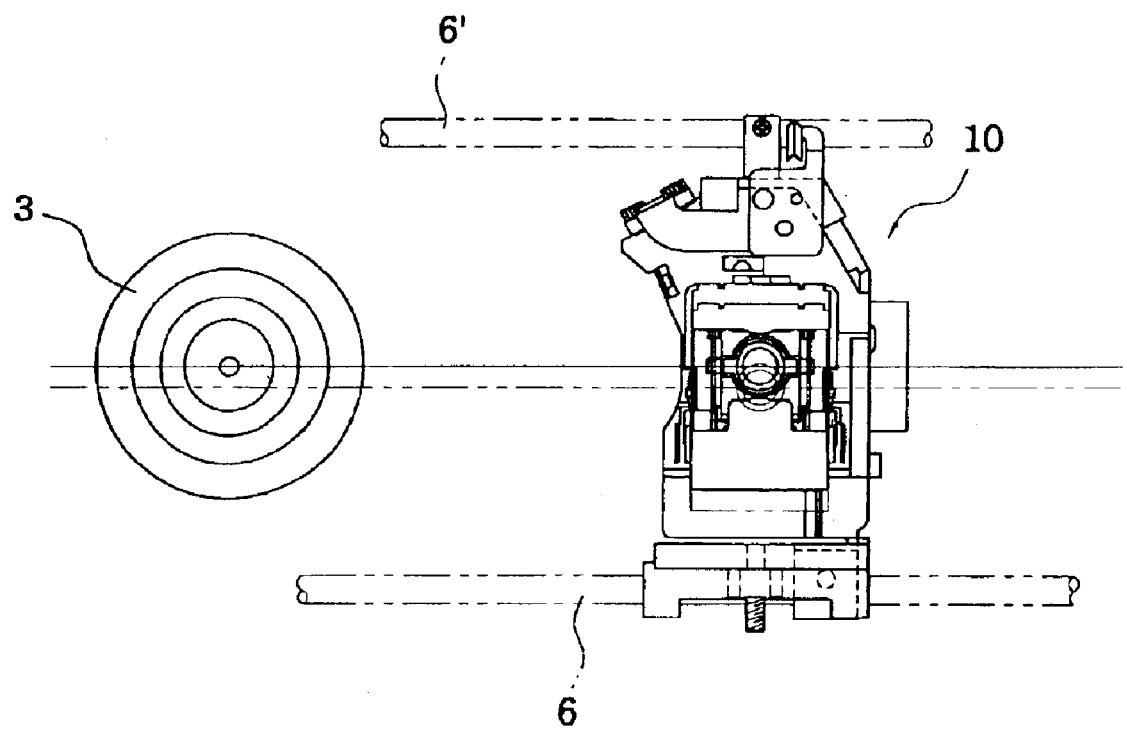
FIG. 7 is a diagram showing the relative positions of the turntable and the optical pickup to describe a technique of overcoming the difference between the phases of the turntable and the object lens.

FIG. 2 is a plan view of a deck base assembly of an optical read and write apparatus in accordance with the present invention. FIG. 3 is a partially exploded plan view of the optical pickup of the optical read and write apparatus of the present invention. FIG. 4 is a partially exploded side view of the optical pickup of the optical read and write apparatus of the present invention. FIG. 5 is a partially sectional plan view showing the assembly of the optical pickup of FIG. 3. FIG. 6 is a front view showing the installation of various springs. FIG. 7 is a diagram showing the relative positions of the turntable and the optical pickup to describe a technique of overcoming the difference between the phases of the turntable and the object lens.

Referring to FIG. 2, an opening 1a is formed in the center portion of a deck base 1, a spindle motor 2 is mounted on one side of the deck base 1 in the vicinity of the opening 1a, and a turntable 3 on which an optical disk "D" is placed is coupled to and rotatably supported by the shaft of the spindle motor 2.

A main shaft 6 and a secondary shaft 6' are arranged to be parallel to each other across the opening 1a, and the ends of the shafts 6 and 6' are supported by support members 7 fastened to the deck base 1 to be tilted.

An optical pickup 5 equipped with an object lens 5a is positioned in the opening 1a to be engaged with the main shaft 6 and the secondary shaft 6' and to be moved along the main shaft 6 and the secondary shaft 6' by a gear train 8.

In addition, in the present invention, the position of the optical pickup 10 can be adjusted in the direction perpendicular to the direction of transfer of the optical pickup 10 so that the centers of the object lens 5a and the turntable 3 maintain the same distance with respect to the main shaft 6 so as to allow the phases of the object lens 5a and the turntable 3 to coincide with each other.

Referring to FIGS. 3 to 6, the optical pickup 10 of the present invention is comprised of a pickup base 20 and a transfer guide 30.

In the pickup base 20, the object lens 5a is provided in the center portion thereof, a guide member 21 having a guide groove 21a fitted around the secondary shaft 6' is formed in the rear portion thereof, and an adjusting screw 22 is extended from the front thereof.

Additionally, two boss assembly recesses 23 are symmetrically formed around the adjusting screw 22 in the front of the pickup base 20, a tension spring receiving recess 24 is formed around each of the boss assembly recesses 23, and a torsion spring receiving recess 25 is formed around the adjusting screw 22. Further, a spring seat 26, in which one end of the torsion spring 50 is inserted and held, is formed on the torsion spring receiving recess 25.

The transfer guide 30 is provided with a guide hole 32 to be fitted around and transferred together with the main shaft 6. The transfer guide 30 may be integrated with a rack gear unit, or jointed to a separate rack gear member.

Two assembly bosses 33 are extended from the back of the transfer guide 30 to be inserted into the boss assembly recesses 23 and horizontally support the pickup base 20.

A connection hole 31 is formed through a portion of the transfer guide 30 to be engaged with the adjusting screw 22.

The pickup base 20 and the transfer guide 30 are jointed together by inserting the adjusting screw 22 into the connection hole 31 and screwing an adjusting nut 60 around the inserted adjusting screw 22.

Meanwhile, tension springs 40 are inserted into the tension spring receiving recesses 24, and press the pickup base 20 in an elastic manner.

Additionally, a torsion spring 50 is inserted into the torsion spring receiving recesses 25. In more detail, one end of the torsion spring 50 is held in a spring seat 26 formed on the torsion spring receiving recess 25 while the other end of the torsion spring 50 is held by the assembly boss 33, so the assembly boss 33 is pressed in a downward direction. Accordingly, a gap that may be caused by the difference between the diameters of each of the boss assembly recesses 23 and each of the assembly bosses 33 can be prevented by the torsion spring 50.

The assembly of the optical pickup of the present invention is described below. The tension springs 40 and the torsion spring 50 are inserted into the recesses 24 and 25 formed in the front portion of the pickup base 20, respectively. One end of the torsion spring 50 is held in the spring seat 26 formed on the torsion spring receiving recess 25, while the other end of the torsion spring 50 is deformed as illustrated by dotted lines in FIG. 6 to be held by the assembly boss 33. Accordingly, the torsion spring 50 presses the assembly boss 33 due to the restoring force of the torsion spring 50, so the assembly boss 33 is tightly brought into contact with boss assembly recess 23, thus preventing vibration and noise when the pickup base 20 is moved.

After the tension and torsion springs 40 and 50 are inserted into the receiving recesses 24 and 25, the adjusting screw 22 is inserted into the connection hole 31. Thereafter, the pickup base 20 is joined with the transfer guide 30 by screwing an adjusting nut 60 around the inserted adjusting screw 22.

After the deck base assembly is assembled, a difference occurring between the phases of the object lens 5a and the turntable 3 can be adjusted by minutely moving the pickup base 20 in the direction perpendicular to the direction of transfer of the optical pickup 10 while selectively tightening and loosening the adjusting nut 60.

That is, in general, in the optical read and write apparatus, the centers of the optical disk D and the object lens 5a need to maintain the same distance with respect to the main shaft 6. The position of the turntable 3 or object lens 5a is changed as indicated by imaginary lines of FIG. 7 due to various causes, such as the variation of positions of parts occurring when the parts are assembled into the optical pickup, the allowance of assembly occurring when the spindle motor or optical pickup is attached to the main shaft and the secondary shaft or the allowance of assembly occurring when the tiles (or skews) of the optical disk and the object lens are adjusted, which generates the phase error.

When the phase error occurs, the position of the pickup base 20 can be adjusted by selectively tightening and loosening the adjusting nut 60 to overcome the phase error because the transfer guide 30 is fixedly attached to the main shaft 6.

That is, when a phase error occurs because the center of the object lens 5a moves close to the main shaft 6 with respect to the center of the turntable 3 as indicated by the imaginary lines of FIG. 7, the phase error can be overcome by loosening the adjusting nut 60 while comparing phases with each other.

In that case, the adjusting screw 22 is transferred along the thread of the adjusting nut 60 and, at the same time, the pickup base 20 equipped with the object lens 5a is minutely moved away from the main shaft 6 by the restoring force of the tension spring 40. When the pickup base 20 is moved to a position where the phases coincide with each other, the pickup base 20 is stopped by loosening the adjusting nut 60.

Of course, when a phase error occurs because the center of the object lens 5a moves away from the main shaft 6 with respect to the center of the turntable 3, the phase error can be overcome by tightening the adjusting nut 60 while comparing phases with each other.

In that case, the adjusting screw 22 is transferred along the thread of the adjusting nut 60 and, at the same time, the pickup base 20 equipped with the object lens 5a is minutely moved close to the main shaft 6. When the pickup base 20 is moved to a position where the phases coincide with each other, the pickup base 20 is stopped by tightening the adjusting nut 60. At this time, the tension spring 40 is compressed and elastically pushes the pickup base 20, so the position of the pickup base 20 is stably adjusted.

As described above, the optical read and write apparatus of the present invention is capable of easily overcoming a phase error in such a way as to allow the position of the pickup base 20 to be easily adjusted by selectively tightening and loosening the adjusting nut 20, so a phase error problem affecting a conventional optical read and write apparatus can be easily solved.

Accordingly, the optical read and write apparatus of the present invention provides an optical pickup having improved performance, increases the reliability of a product and provides great competitiveness.

As described above, the present invention provides an optical read and write apparatus that allows the position of a pickup base to be easily adjusted in the direction perpendicular to the direction of transfer of an optical pickup, so the non-coincidence in the phases of an object lens and a turntable can be overcome, thereby improving the optical performance of the optical read and write apparatus and increasing the reliability of the optical read and write apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical read and write apparatus, comprising:
   a deck base in which an opening is formed in a center portion thereof, a main shaft and a secondary shaft are disposed at both sides of the opening, and a turntable on which an optical disk is placed is mounted on one side thereof;
   a pickup base in which an object lens is provided in the center portion thereof, a guide member having a guide groove fitted around the secondary shaft is formed in the rear portion thereof, and an adjusting screw is extended from the front thereof;
   a transfer guide in which a connection hole is formed to receive the adjusting screw of the pickup base and to allow the transfer guide to be joined to the pickup base by an adjusting nut, and a guide hole is formed to be fitted around the main shaft; and
   one or more tension springs positioned between the pickup base and the transfer guide to elastically press the pickup base.

2. The optical read and write apparatus according to claim 1, wherein two boss assembly recesses are symmetrically formed around the adjusting screw in a front of the pickup base, and two assembly bosses are extended from a back of the transfer guide to be inserted into the boss assembly recesses and horizontally support the pickup base.

3. The optical read and write apparatus according to claim 2, wherein a torsion spring receiving recess is formed in the front of the pickup base to receive the torsion spring, a spring seat 26 is formed on the torsion spring receiving recess 25, and the torsion spring is held at its first end in a spring seat and at its second end by the assembly boss so as to downwardly press the assembly boss.

4. The optical read and write apparatus according to claim 1, wherein one or more tension spring receiving recesses are symmetrically formed around the adjusting screw, and the tension springs are inserted into and supported in the tension spring receiving recesses.

5. An optical read and write apparatus in which an opening is formed in a portion thereof, a turntable on which an optical disk is placed is mounted on one side thereof, and an optical pickup is coupled to a main shaft and a secondary shaft disposed at both sides of the opening and reads and writes information from/onto an optical disk while reciprocating along the opening, wherein:
   the optical pickup is comprised of a pickup base, in which an object lens is provided in the center portion of the pickup base and a guide member having a guide groove fitted around the secondary shaft is formed in the rear portion of the pickup base, and a transfer guide coupled to be moved along the main shaft;
   the pickup base and the transfer guide are joined together by inserting an adjusting screw extended from the front of the pickup base into a connection hole formed through the transfer guide and tightening an adjusting nut around the inserted adjusting screw, so as to allow an interval therebetween to be adjusted; and
   one or more tension springs are disposed between the pickup base and the transfer guide to elastically press the pickup base.

6. The optical read and write apparatus according to claim 5, wherein two boss assembly recesses are symmetrically formed around the adjusting screw in a front of the pickup base, and two assembly bosses are extended from a back of the transfer guide to be inserted into the boss assembly recesses and horizontally support the pickup base.

7. The optical read and write apparatus according to claim 6, wherein a torsion spring receiving recess is formed in the front of the pickup base to receive the torsion spring, a spring seat 26 is formed on the torsion spring receiving recess 25, and the torsion spring is held at its first end in a spring seat and at its second end by the assembly boss so as to downwardly press the assembly boss.

8. The optical read and write apparatus according to claim 5, wherein one or more tension spring receiving recesses are symmetrically formed around the adjusting screw, and the tension springs are inserted into and supported in the tension spring receiving recesses.

* * * * *